United States Patent
Ward et al.

(10) Patent No.: US 10,954,382 B2
(45) Date of Patent: Mar. 23, 2021

(54) POLYMER COMPOSITIONS INCLUDING POLYSULFONES AND ARTICLES MADE THEREFROM

(71) Applicant: SOLVAY SPECIALTY POLYMERS USA, LLC, Alpharetta, GA (US)

(72) Inventors: Christopher Ward, Sandy Springs, GA (US); Vito Leo, Glimes Incourt (BE); Yuhong Wu, Flushing, NY (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 16/311,963

(22) PCT Filed: Jun. 28, 2017

(86) PCT No.: PCT/EP2017/066047
§ 371 (c)(1),
(2) Date: Dec. 20, 2018

(87) PCT Pub. No.: WO2018/002167
PCT Pub. Date: Jan. 4, 2018

(65) Prior Publication Data
US 2019/0177538 A1 Jun. 13, 2019

Related U.S. Application Data

(60) Provisional application No. 62/356,205, filed on Jun. 29, 2016.

(51) Int. Cl.
*C08L 81/06* (2006.01)
*C08L 81/04* (2006.01)
*C08K 7/14* (2006.01)

(52) U.S. Cl.
CPC ............. *C08L 81/06* (2013.01); *C08K 7/14* (2013.01); *C08L 81/04* (2013.01); *C08L 2205/02* (2013.01)

(58) Field of Classification Search
CPC ............ C08L 81/04; C08L 81/06; C08K 7/14
See application file for complete search history.

(56) References Cited

U.S. PATENT DOCUMENTS

| | | |
|---|---|---|
| 5,049,446 A | 9/1991 | Blackwell et al. |
| 5,502,122 A | 3/1996 | Weber et al. |
| 5,840,793 A | 11/1998 | Glaser et al. |
| 9,212,281 B2 | 12/2015 | Weber et al. |
| 2007/0021549 A1 | 1/2007 | Kojima et al. |
| 2012/0296028 A1* | 11/2012 | Weber ............... C08K 3/04 524/496 |
| 2013/0131210 A1 | 5/2013 | Gerrard et al. |

FOREIGN PATENT DOCUMENTS

| | | |
|---|---|---|
| EP | 0266791 A2 | 5/1988 |
| EP | 0382409 A2 | 8/1990 |
| EP | 2738219 A1 | 6/2014 |
| JP | 58098362 A2 | 6/1983 |
| JP | 11043603 A | 2/1992 |
| JP | 2002249663 A | 9/2002 |
| KR | 2015014144 A | 2/2015 |
| WO | 2014177392 A1 | 11/2014 |
| WO | 15024439 A1 | 2/2015 |

OTHER PUBLICATIONS

Haton hb DL—Sichuan Deyang. Omnexus. Datasheet. (Year: 2019).*
Standard ASTM D1238-04, "Standard Test Method for Melt Flow Rates of Thermoplastics by Extrusion Plastometer", 2004, p. 1-13.

* cited by examiner

*Primary Examiner* — Michael M Dollinger
(74) *Attorney, Agent, or Firm* — Beatrice C. Ortego

(57) ABSTRACT

The present invention relates to a composition (C) comprising a polymer blend including a polyarylether sulfone polymer and a polyarylene sulfide polymer and to an article including said composition.

11 Claims, No Drawings

POLYMER COMPOSITIONS INCLUDING POLYSULFONES AND ARTICLES MADE THEREFROM

RELATED APPLICATION

This application claims priority to U.S. provisional application No. 62/356,205 filed on Jun. 29, 2016, the whole content of this application being incorporated herein by reference for all purposes.

TECHNICAL FIELD

The present invention relates to a composition (C) comprising a polymer blend including a polyarylether sulfone polymer and a polyarylene sulfide polymer and to an article including said composition.

BACKGROUND

Polyarylether sulfones have excellent properties such as strength, chemical and thermal resistance and are used in many applications ranging from plumbing articles, electronic components, airplane and automotive parts and medical devices.

Compositions comprising polyarylether sulfones reinforced by glass fibers have been available for several years; however, their use in some areas is hindered by their overall poor mechanical performance, especially with respect to their impact resistance and low tensile strength, and by their high viscosity, which limits moldability and fiber content. Thus, available glass fiber-reinforced compositions comprising polyarylether sulfones are generally unsuitable for molding compositions for thin-walled parts with enhanced ductility.

The aim of the present invention is to provide compositions having reduced viscosity, enhanced moldability, and improved mechanical properties such as impact strength.

SUMMARY

The invention is directed to a polymer composition (C) comprising:
  from 15 to 60% in weight based on the total weight of (C) of a component (a) consisting of glass fibers;
  from 85 to 40% in weight based on the total weight of (C) of a component (b) consisting of:
    from 99.5 to 70% in weight based on the total weight of (b) of a polyarylethersulfone polymer (PAES) and
    from 0.5 to 30% in weight based on the total weight of (b) of a polyarylene sulfide polymer (PAS) having a weight average molecular weight from 30,000 to 70,000 g/mol as measured via GPC
  from 0 to 10% in weight based on the total weight of (C) of at least one additive (AD), wherein
at least 50 mol % of recurring unit of PAES ($R_{PAES}$) are represented by the following formula (I):

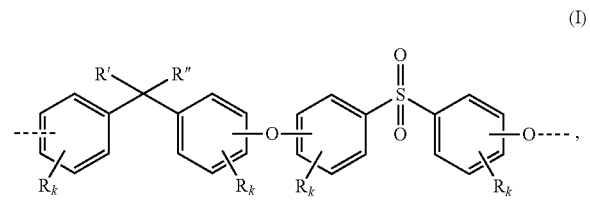

where (i) each $R_k$, equal to or different from each other, is selected from hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; (ii) each R' and R", equal to or different from each other, is selected from hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; (iii) each k, equal to or different from each other, is an integer ranging from 0 to 4.

In another aspect, the present invention provides an article (A) including at least a part comprising composition (C) as defined above.

In another aspect, the present invention provides a process for the preparation of an article or part of an article, said process comprising the steps of:
  preparing the polymer composition (C) by blending in a molten phase components (a) and (b), and optionally (AD) and other ingredients, and forming the article, or part thereof, comprising the polymer composition (C) by extrusion or molding.

DETAILED DESCRIPTION

Described herein is a composition comprising glass fibers and a polymeric portion having a (i) poly(arylether sulfone) ("PAES") polymer and (ii) a polyarylenesulfide ("PAS") polymer. In some embodiments, the polymer compositions can optionally include one or more additives. It has been surprisingly found that the aforementioned polymer compositions have outstanding mechanical properties, in particular with respect to impact strength, and processability, specifically for moldability. In one aspect, the polymer compositions can be desirably used in applications in which parts with thin walls are needed which must have high heat and chemical resistance and can withstand moderate to severe impacts.

In some embodiments, the polymer compositions can be desirably used in articles such as components of plumbing articles, electronic devices, medical devices and automotive or airplane parts.

Unless otherwise specified, in the context of the present invention the amount of a component in a composition is indicated as the ratio between the weight of the component and the total weight of the composition multiplied by 100 (also: "wt %" or "% in weight").

The Polyarylether Sulfone Polymer

The compositions according to the present invention include at least one polyarylether sulfone (PAES) polymer having at least 50 mol % of recurring unit ($R_{PAES}$) represented by the following formula (I):

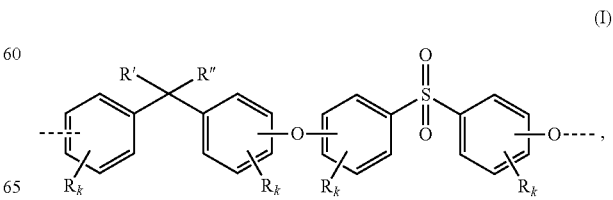

where (i) each $R_k$, equal to or different from each other, is selected from hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; (ii) each R' and R", equal to or different from each other, is selected from hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; (iii) each k, equal to or different from each other, is an integer ranging from 0 to 4.

In some embodiments, in the composition (C), the PAES can have at least 55 mol %, at least 60 mol %, at least 70 mol %, at least 80 mol %, at least 90 mol %, at least 95 mol %, at least 99 mol %, or at least 99.9 mol % of recurring unit ($R_{PAES}$).

In some embodiments, ($R_{PAES}$) can be represented by the following formula:

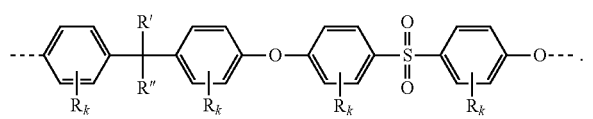
(II)

In some embodiments in which ($R_{PAES}$) is represented by Formula (II), each k=0. In some embodiments in which ($R_{PAES}$) is represented by Formula (II), R' and R" are an alkyl group selected from a $C_1$-$C_8$ linear or branched alkyl group, preferably a $C_1$-$C_8$ linear or branched alkyl group, more preferably both R' and R" are a methyl group (—CH$_3$). In some preferred embodiments of the invention, PAES is a PolySulfone (PSU) polymer, that is intended to denote a polymer wherein at least 50% of the recurring units ($R_{PAES}$) is represented by Formula (II), wherein R' and R" are a methyl group (—CH$_3$) and each k=0, thus ($R_{PAES}$) is represented by the following formula (III) ($R_{PSU}$):

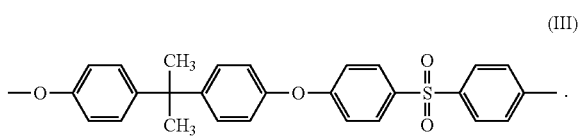
(III)

In general, the PAES polymer can be a homopolymer or a copolymer. In embodiments in which the PAES polymer is a copolymer, the PAES can further include recurring unit ($R_{PAES}$*), distinct from recurring unit ($R_{PAES}$), represented by a formula selected from the following group of formulae:

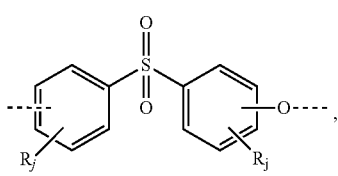
(IV)

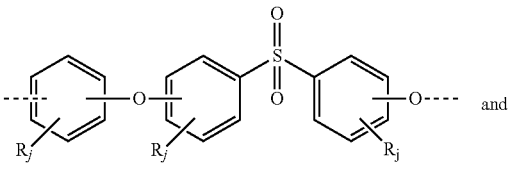
(V)

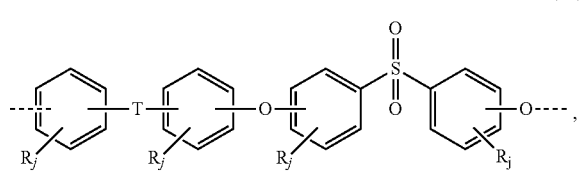
(VI)

wherein:
each of $R_j$, equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; each of j, equal to or different from each other, is an integer from 0 to 4; and T is selected from a bond, —CH$_2$—; —O—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$^a$C=CR$^b$—; where each R$^a$ and R$^b$; independently of one another, is a hydrogen or a C$_1$-C$_{12}$-alkyl, C$_1$-C$_{12}$-alkoxy, or C$_6$-C$_{18}$-aryl group; —(CH$_2$)$_q$— and —(CF$_2$)$_q$—, where q is an integer ranging from 1 to 6, or an aliphatic divalent group, linear or branched, of up to 6 carbon atoms; and mixtures thereof.

In some embodiments, recurring unit ($R_{PAES}$*) can be represented by a formula selected from the following group of formulae:

(VII)

(VIII)

(IX)

and mixtures thereof.

In some embodiments, in which the PAES polymer is a copolymer, the PAES can have at least about 1 mol %, at least about 5 mol %, or at least about 10 mol % recurring unit ($R_{PAES}$*). In such embodiments, the PAES polymer can have no more than about 50 mol %, no more than about 40 mol %, no more than about 30 mol %, or no more than 20 mol % recurring unit ($R_{PES}$).

The PAES polymer can have a weight average molecular weight from about 20,000 grams/mole (g/mol) to about 100,000 g/mol or from about 40,000 g/mol to about 80,000 g/mol. A person of ordinary skill in the art will recognize that additional weight average molecular weight ranges within the explicitly disclosed ranges are contemplated and within the scope of the present disclosure. The weight average molecular weight can be determined as $$M_w = \frac{\sum M_i^2 \cdot N_i}{\sum M_i \cdot N_i},$$

where $M_i$ is the discrete value for the molecular weight of a polymer molecule in a sample and $N_i$ is the number of polymer molecules in the sample with molecular weight $M_i$. Weight average molecular weight can be measured by gel permeation chromatography using in methylene chloride as a solvent and compared to polystyrene standard.

The PAES polymers of interest herein may have a glass transition temperature ("$T_g$") of at least about 170° C., at least about 180° C., or at least about 185 C. The glass transition temperature can be measured using differential scanning calorimetry ("DSC") using a ramp rate of 20° C./minute according to the ASTM D3418 standard.

In preferred embodiments, in the polymer composition (C) of the invention, the amount of PAES is from 97 to 70%, preferably from 95 to 80%, more preferably from 93 to 85% or 92 to 90% in weight based on the weight of component (b).

A person of ordinary skill in the art will recognize additional PAES concentration ranges within the explicitly disclosed ranges are contemplated and within the scope of the present disclosure.

The Polyarylene Sulfide Polymer

For the purpose of the present invention, the term "polyarylene sulfide polymer [polymer (PAS)]" is intended to denote any polymer comprising recurring units wherein more than 50% by moles of said recurring units are recurring units ($R_{PAS}$) of formula:

—(Ar—S)— wherein Ar denotes an aromatic moiety comprising at least one aromatic mono- or poly-nuclear cycle, such as a phenylene or a naphthylene group, which is linked by each of its two ends to two sulfur atoms forming sulfide groups via a direct C—S linkage.

In recurring units ($R_{PAS}$), the aromatic moiety Ar may be unsubstituted (i.e. a phenyl group) substituted by one or more substituent groups, including but not limited to halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and substituted or unsubstituted arylene sulfide groups, the arylene groups of which are also linked by each of their two ends to two sulfur atoms forming sulfide groups via a direct C—S linkage thereby creating branched or cross-linked polymer chains.

The polymer (PAS) preferably comprises more than 70% by moles, more preferably more than 80% by moles, still more preferably more than 90% by moles of recurring units ($R_{PAS}$). Most preferably, the polymer (PAS) contains no recurring units other than recurring units ($R_{PAS}$).

In recurring units ($R_{PAS}$), the aromatic moiety Ar is preferably selected from the group consisting of those of formulae (X-A) to (X-K) here below:

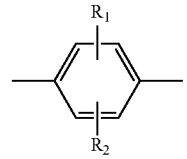

(X-A)

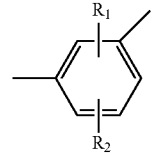

(X-B)

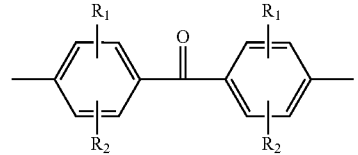

(X-C)

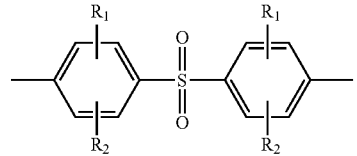

(X-D)

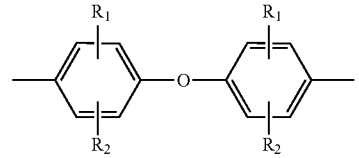

(X-E)

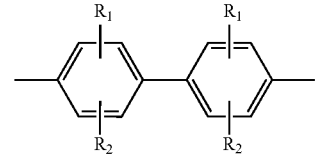

(X-F)

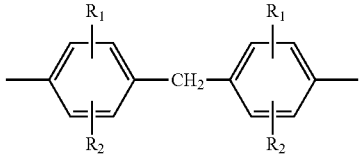

(X-G)

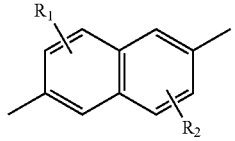

(X-H)

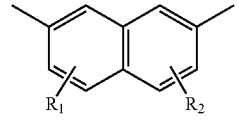

(X-I)

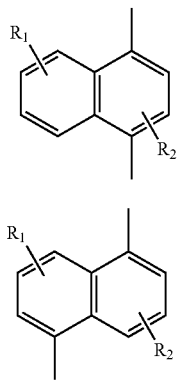

(X-J)

(X-K)

wherein $R_1$ and $R_2$, equal to or different from each other, are selected from the group consisting of hydrogen atoms, halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and substituted or unsubstituted arylene sulfide groups, the arylene groups of which are also linked by each of their two ends to two sulfur atoms. This forms sulfide groups via a direct C—S linkage thereby creating branched or cross-linked polymer chains.

The polymer (PAS) may be a homopolymer or a copolymer such as a random copolymer or a block copolymer.

The polymer (PAS) typically comprises one or more branched or cross-linked recurring units selected from the group consisting of those of formulae (X-L) to (X-N) here below:

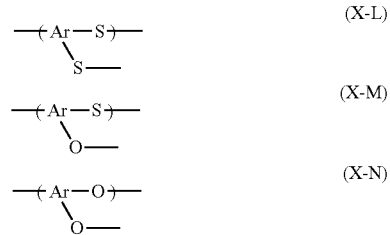

(X-L)

(X-M)

(X-N)

The polymer (PAS) is preferably a polyphenylene sulfide polymer [polymer (PPS)]. Preferably the polymer PAS is a "polyphenylene sulfide polymer [polymer (PPS)]", that is intended to denote any polymer comprising recurring units wherein more than 50% by moles of said recurring units are p-phenylene sulfide recurring units ($R_{PPS}$) of formula:

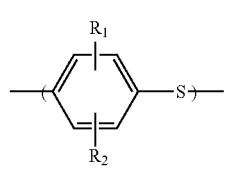

($R_{PPS}$)

wherein the p-phenylene group is linked by each of its two ends to two sulfur atoms forming sulfide groups via a direct C—S linkage, wherein $R_1$ and $R_2$, equal to or different from each other, are selected from the group consisting of hydrogen atoms, halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and substituted or unsubstituted arylene sulfide groups, the arylene groups of which are also linked by each of their two ends to two sulfur atoms forming sulfide groups via a direct C—S linkage thereby creating branched or cross-linked polymer chains. Most preferably, the PAS is a PPS wherein $R_1$ and $R_2$ are hydrogen atoms. Advantageously, the weight average molecular weight (i.e. relative molar mass) of the PAS in the composition of the invention is from 30,000 to 70,000 g/mol as measured via gel permeation chromatography (GPC), e.g. in chloronaphthalene as a solvent at 220° C. and compared to polystyrene standard, preferably from 35,000 to 60,000 g/mol or from 40,000 to 50,000 g/mol.

PPS having a Mw comprised in this range have a melt flow rate at 316° C. under a weight of 5 kg according to ASTM D1238, procedure B, comprised between 100 and 500 g/10 min. Preferably, in the polymer composition (C) of the invention, the PAS has a mass melt flow rate at 316° C. under a weight of 5 kg according to ASTM D1238, procedure B, higher than 140 g/10 min, preferably higher than 150 g/10 min.

Preferably, in the polymer composition (C) of the invention, PAS has a mass melt flow rate at 316° C. under a weight of 5 kg according to ASTM D1238, procedure B, lower than 450 g/10 min, preferably lower than 300 g/10 min.

Typically, the PAS in the composition according to the invention has an extremely low level of —SH terminal groups (acid form) or —SM (neutralized form) with M being an alkali metal such as Na, K, Li or an alkali earth metal such as Ca, such as at most 10 microequiv/g (corresponding to at most ~0.03 weight %). According to a preferred embodiment the content of —SH terminal groups of the PAS is less than 0.5%, preferentially less than 0.2%, even more preferentially less than 0.1%;

Additives

In some embodiments, the polymer composition can include one or more additives. Additives can include, but are not limited to, fillers, inorganic pigments, UV/light stabilizers, heat stabilizers, plasticizers, lubricants, processing aids, impact modifiers, flame retardants and antistatic agents.

In some embodiments, the polymer composition includes a filler other than a glass fiber. Desirable fillers include, but are not limited to, carbon fibers, graphite fibers, silicon carbide fibers, aramide fibers, wollastonite, talc, mica, titanium dioxide, potassium titanate, silica, kaolin, chalk, alumina, boron nitride, and aluminum oxide. Fillers improve possibly notably mechanical strength (e.g. flexural modulus) and/or dimensional stability and/or friction and wear resistance. For the embodiments of interest herein, the polymer composition can have a total filler concentration from about 1 wt. % to no more than about 40 wt. %, no more than about 30 wt. %, no more than about 25 wt. %, or no more than about 20 wt. %. A person of ordinary skill in the art will recognize additional filler concentrations within the explicitly disclosed ranges are contemplated and within the scope of the present disclosure.

In some embodiments, a class of fillers can include clay mineral fillers.

In some embodiments, the polymer composition can optionally include one or more inorganic pigments. In general, inorganic pigments are added to obtain a selected appearance of the polymer composition by changing the color of reflected or transmitted light as the result of wavelength-selective absorption. Desirable inorganic pigments include, but are not limited to, titanium dioxide, zinc sulfide, barium sulfate, carbon black, cobalt phosphate, cobalt titanate, cadmium sulfoselenide, cadmium selenide, copper phthalocyanine, ultramarine, ultramarine violet, zinc ferrite, magnesium ferrite, and iron oxides. The polymer compositions of interest herein can optionally have a total inorganic pigment concentration of from about 0.1 wt. % to about 20 wt. %, preferably from 1 to 10 wt. % or from 2 to 5 wt %. A person of ordinary skill in the art will recognize additional pigment concentrations within the explicitly disclosed ranges are contemplated and within the scope of the present disclosure.

Glass Fibers

The composition of the invention contains glass fibers as component (a).

Preferably, in the composition according to the invention the amount of component (a) is 20 to 60%, more preferably 25 to 50% in weight based on the total weight of (C).

Glass fibers are produced having various compositions and their general applications are identified by means of a letter designation. The letter designation represents a family of glasses that have provided acceptable performance to the end-user in the intended application. Standard specification for glass fiber strands is provided in ASTM standard D578-05, and equivalents thereof. In the context of the present invention, as non-limiting examples, glass fibers can be made of C glass, E glass, S glass or a mixture thereof. Preferably, glass fibers in the assembly of the invention are made of E glass.

The length and diameter of the glass fibers in the assembly of the invention are not particularly limited. As non-limiting examples, the average fiber diameter can be from 5 to 20 micrometers, such as 8 or 10 to 15 micrometers, and the standard cut length can vary from 3 to 10 mm, such as 4, 4.5, 5 or 6 to 8 mm.

The mechanical properties of the glass fibers in the assembly of the invention are not particularly limited. As non-limiting examples, their tensile strength can be from 75 to 200 MPa, such as 80, 90 or 100 to 150 or 180 MPa, their tensile elongation (%) can be from 1 to 5, such as 2 or 3 to 4.5 or 4%, their impact strength (Charpy, ISO 179, unnotched) is from 40 to 80 kJ/m2, such as 50 or 60 or 65 to 70 or 75 kJ/m2.

Articles

As outlined above, the polymer compositions of the invention have outstanding ductility and mechanical properties, in particular with respect to resistance to impact.

Thus, they are particularly suitable for the preparation of an article (A) including at least a part comprising composition (C) as defined above. Preferably, the article is selected from the group consisting of a plumbing fixture, a medical device and a portable electronic device.

The articles described herein can be formed using techniques well known in the art, including but not limited to, injection molding, blow molding, compression molding and any combination thereof.

In an aspect, the present invention provides a process for the preparation of an article or part of an article, said process comprising the steps of:
preparing the polymer composition (C) as described above by blending components (a) and (b), and optionally (AD) and other ingredients, and forming the article, or part thereof, comprising the polymer composition (C) by extrusion or molding.

Should the disclosure of any patents, patent applications, and publications which are incorporated herein by reference conflict with the description of the present application to the extent that it may render a term unclear, the present description shall take precedence.

The following examples are provided to illustrate practical embodiments of the invention, with no intention to limit its scope.

EXAMPLES

Starting Materials:
PAES:
Udel® P1700 NT11 (PAES 1) or Udel® P3703 NT11 (PAES 2) produced by Solvay Specialty Polymers USA, L.L.C.
Other Polyarylether Sulfone:
Radel® R5800 (PPSU) and Veradel® 3300 (PES) produced by Solvay Specialty Polymers USA, L.L.C.
PAS:
Ryton® QC220N (PAS 1) having Mw=46,000 g/mol, Ryton® QA250N (PAS 2) having Mw=40,000 g/mol and flow rate of 325 g/10 min or Ryton® QA220N (PAS 3) having Mw=47,000 g/mol and flow rate of 160 g/10 min, produced by Solvay Specialty Polymers USA, L.L.C.
DSP T-4G (PAS 4), produced by Dainippon Ink and Chemicals (DIC International L.L.C.), that has Mw=35,000 g/mol.
Analytical Method
Molecular Weight Measurements by a GPC Method
For PAES, Size Exclusion Chromatography (SEC or GPC) was performed using Methylene Chloride as a mobile phase. Two 5 micron mixed D columns with guard column from Agilent Technologies was used for separation. An ultraviolet detector of 254 nm is used to obtain the chromatogram. A flow rate of 1.5 ml/min and injection volume of 20 micro liters of a 0.2% w/v solution in mobile phase was selected.

Calibration was performed using 10 narrow calibration standards of Polystyrene obtained from Agilent Technologies (Peak molecular weight range: 371,000 to 580 g/mol)

Calibration Curve: 1) Type: Relative, Narrow calibration standard calibration 2) Fit: 3rd order regression.

Integration and calculation: Empower Pro GPC software manufactured by Waters used to acquire data, calibration and molecular weight calculation. Peak integration start and end points are manually determined from significant difference on global baseline.

For PAS, 1-chloronaphthalene was used as a mobile phase and solvent at 220° C. and calibration was performed using 9 narrow calibration standards of Polystyrene (Peak molecular weight range: 758,500 to 1280 g/mol), using Two 10 micron mixed B columns and RI detector.

Glass Fibers:
Vetrotex® 910A supplied by Saint-Gobain
Compounding
All compounds were created in a similar fashion to the commercial glass-filled grades of polysulfones. No pre-blends were utilized, meaning the neat materials were all added separately to an extruder to be mixed during extrusion.

All compounding was performed on a ZSK-26 R&D extruder.

Extrusion Conditions
Barrel conditions were specified in order to achieve a melt temperature between 360° C. and 380° C., preferably between 360° C. and 370° C. in order not to begin to degrade the PAS or any additives. Screw speeds were set between 160 RPM and 200 RPM. Feed rates were set according to the desired composition of each formulation. PAS and PAES are introduced at the beginning of the extruder and the glass fibers later in the extruder to the molten blend PAES/PAS.

Molding

All compounds were molded into traditional ASTM Type I tensile bars and ASTM flex bars.

Testing

All molded articles were tested for mechanical properties (tensile and impact) as well as thermal properties (capillary flow, melt flow). Tensile properties were tested according to ASTM D638 using the ASTM Type I tensile bars. Impact properties were tested using a notched Izod test (ASTM D256) and utilizing the ASTM flex bars. Melt flow was measured using ASTM D1238.

1. Compositions Containing 30% Glass Fibers

The following examples include 70% of polymeric component (b) (PAES 1 as the major polymer, PAS 1 as the minor polymer), and 30% in weight based on the total weight of the composition of glass fibers as component (a).

Composition of component (b) (in weight % based on the total weight of (b):
Example 1c—comparative—(E1c): 100% PAES 1
Example 2 (E2): 97% PAES 1, 3% PAS 1
Example 3 (E3): 95% PAES 1, 5% PAS 1
Example 4 (E4): 93% PAES 1, 7% PAS 1
Example 5 (E5): 90% PAES 1, 10% PAS 1
Example 6 (E6): 85% PAES 1, 15% PAS 1
Example 7 (E7): 80% PAES 1, 20% PAS 1

Weight compositions of examples in Table 2: PAES (PSU) ratio in weight % based on the total weight of (b):
Example 8c—comparative—(E9c): (b)=50% (100% PAES 1), (a)=50%
Example 9 (E9): (b)=50% (86% PAES 1, 14% PAS 2), (a)=50%
Example 10c—comparative—(E10c): (b)=50% (100% PAES 2), (a)=50%
Example 11 (E11): (b)=50% (86% PAES 2, 14% PAS 2), (a)=50%

|  |  | E8c | E9 | E10c | E11 |
|---|---|---|---|---|---|
| Notched Izod | J/m | 61.4 | 87.0 | 54.5 | 92.4 |
| Modulus of elasticity | GPa | 14.89 | 16.48 | 15.31 | 16.69 |
| Tensile elongation at break | % | 1.1 | 1.4 | 1.1 | 1.4 |
| Tensile strength at break | MPa | 116 | 149 | 121 | 151 |

A very noticeable increase in tensile properties is obtained for compositions according to the invention where PAS is present.

When PAS is added to PAES, there is a large increase in tensile strength and modulus.

In addition, surprisingly notched Izod impact values increase again. In summary, the compositions of the inven-

|  |  | E1c | E2 | E3 | E4 | E5 | E6 | E7 |
|---|---|---|---|---|---|---|---|---|
| Notched Izod | J/m | 73.7 | 88.6 | 89.7 | 90.2 | 85.9 | 84.3 | 81.1 |
| Modulus of elasticity | GPa | 8.62 | 9.10 | 9.24 | 9.24 | 9.51 | 9.86 | 10.34 |
| Tensile elongation at break | % | 2.2 | 2.2 | 2.3 | 2.3 | 2.3 | 2.2 | 2.0 |
| Tensile strength at break | MPa | 115 | 126 | 130 | 130 | 131 | 134 | 136 |
| Melt Flow rate (350° C.) | g/10 min | 8.5 | 8.5 | 9.7 | 11.3 | 12.5 | 16.9 | 22.9 |

Surprisingly in all samples, the addition of PAS 1 positively affects the rheological properties, dramatically increasing the melt flow (up to 170%) and increases all tensile properties (tensile strength, tensile modulus) and at the same time impact strength as well. Notably, there is a favorable increase in notched Izod impact resistance (up to 22%).

An interesting fact to note is that at 20% PAS 1 (E7), the melt flow of the formulation is similar to that of neat PAES 1 without glass fibers at all and the notched Izod impact value is still higher than that of comparative example E1c, which contains no PAS.

2. Compositions Containing 50% Glass Fibers

In view of the observed flow enhancement and fiber length retention when adding PAS in glass-filled PAES, the glass content was increased from 30% to 50% in order to increase mechanical properties even higher. Normally, without the use of PAS, PAES of the type of PSU formulations with this amount of glass are difficult to process due to flow and the fibers are damaged so much as to not result in favorable properties. This experiment utilized both PAES 1 and PAES 2 as the PAES phase, PAS 2 as the PAS phase, and glass fibers.

tion achieve higher mechanical properties even for highly filled composition containing 50% glass fibers while reducing compounding issues (reduce processing difficulties) which are usually encountered when using high amounts of glass fibers.

Comparison of PAES of the Invention with Different Polyarylether Sulfone PPSU and PES The following examples include 70% of polymeric component (b) (PAES 1, PPSU, or PES as the major polymer, PAS 4 as the minor polymer), and 30% in weight based on the total weight of the composition of glass fibers as component (a).

Composition of component (b) (in weight % based on the total weight of (b):
Example 12—comparative—(E12c): 100% PAES 1
Example 13 (E13): 90% PAES 1, 10% PAS 4
Example 14—comparative—(E14c): 100% PPSU
Example 15—comparative—(E15c): 90% PPSU, 10% PAS 4
Example 16—comparative—(E16c): 100% PES
Example 17—comparative—(E17c): 90% PES, 10% PAS 4

|  |  | E12c | E13 | E14c | E15c | E16c | E17c |
|---|---|---|---|---|---|---|---|
| Notched Izod | J/m | 79.0 | 94.5 | 87.0 | 81.0 | 67.8 | 50.7 |
| Modulus of elasticity | GPa | 9.17 | 9.72 | 8.62 | 9.24 | 9.72 | 10.62 |
| Tensile elongation at break | % | 2.1 | 2.2 | 2.7 | 2.0 | 2.3 | 1.7 |
| Tensile strength at break | MPa | 121.4 | 138.6 | 123.4 | 125.5 | 140.0 | 132.4 |
| Melt Flow rate (350° C.) | g/10 min | 7.3 | 7.7 | 7.34 | 8.48 | 12.1 | 14.1 |

With the addition of PAS to PAES 1, there is an increase in both impact resistance and tensile properties. Surprisingly, this only occurs with PAES 1. With the addition of PAS to either PPSU or PES, there is a decrease in impact resistance and moderate to no increase in tensile properties. The composition E13 shows a tensile strength and modulus similar to PES compound of comparative example E16c, but it provides a higher resistance to impact, which is a compromise that is very important for the application.

What is claimed is:

1. A polymer composition (C) comprising:
from 25% to 50% in weight based on the total weight of the polymer composition (C) of a component (a) consisting of glass fibers;
from 85% to 40% in weight based on the total weight of the polymer composition (C) of a component (b) consisting of:
from 99.5% to 80% in weight based on the total weight of the component (b) of a polyaryl sulfone polymer (PAES) and
from 0.5% to 20% in weight based on the total weight of the component (b) of a polyarylene sulfide polymer (PAS) having a weight average molecular weight from 30,000 to 70,000 g/mol as measured via GPC;
from 0% to 10% in weight based on the total weight of the polymer composition (C) of at least one additive (AD),
wherein the polyaryl sulfone polymer (PAES) is a polysulfone polymer (PSU) comprising at least 50% of recurring units ($R_{PAES}$) of formula (III):

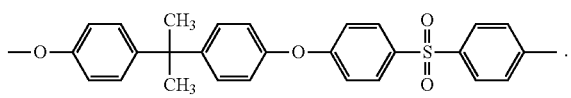
(III)

and
wherein the polyarylene sulfide polymer (PAS) has a level of —SH terminal groups or —SM terminal groups with M being an alkali metal or an alkali earth metal of at most 10 microequivalent/g.

2. The polymer composition (C) of claim 1, wherein the amount of component (a) is from 30% to 50% in weight based on the total weight of the polymer composition (C).

3. The polymer composition (C) of claim 1, wherein the amount of the polyaryl sulfone polymer (PAES) is from 97% to 80% in weight based on the weight of the component (b).

4. The polymer composition (C) of claim 1, wherein the polyarylene sulfide polymer (PAS) is a poly(phenylene sulfide) polymer, polymer (PPS), comprising more than 50% by moles of p-phenylene sulfide recurring units ($R_{PPS}$) of formula:

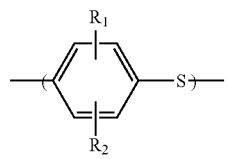
($R_{PPS}$)

wherein the p-phenylene group is linked by each of its two ends to two sulfur atoms forming sulfide groups via a direct C—S linkage, and $R_1$ and $R_2$, equal to or different from each other, are selected from the group consisting of hydrogen atoms, halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and substituted or unsubstituted arylene sulfide groups, the arylene groups of which are also linked by each of their two ends to two sulfur atoms forming sulfide groups via a direct C—S linkage thereby creating branched or cross-linked polymer chains.

5. The polymer composition (C) of claim 1, wherein the polyarylene sulfide polymer (PAS) has a mass melt flow rate lower than 450 g/10 min. at 316° C. under a weight of 5 kg according to ASTM D1238, procedure B.

6. The polymer composition (C) of claim 1, comprising 0.5% or more in weight based on the total weight of the polymer composition (C) of the at least one additive (AD) selected from fillers, inorganic pigments, UV/light stabilizers, heat stabilizers, plasticizers, lubricants, processing aids, impact modifiers, flame retardants, antistatic agents, and mixtures thereof.

7. An article (A) comprising at least a part comprising the polymer composition (C) of claim 1.

8. The article (A) of claim 7, wherein the article is selected from the group consisting of a plumbing fixture, a medical device, and a portable electronic device.

9. A process for making an article or part of an article, said process comprising the steps of:
preparing the polymer composition (C) of claim 1 by blending the component (a) and the component (b), and optionally the at least one additive (AD) and other ingredients, and forming the article, or part thereof, comprising the polymer composition (C) by extrusion or molding.

10. The polymer composition (C) of claim 1, wherein the amount of component (a) is from 30% to 45% in weight based on the total weight of the polymer composition (C).

11. The polymer composition (C) of claim 2, wherein the amount of component (a) is about 50% in weight based on the total weight of the polymer composition (C).

* * * * *